United States Patent

[11] 3,611,047

[72] Inventors Joseph Burton Buzard
Emporium;
Kenneth W. Coleman, North Warren, Pa.;
Martin Leroy Zelenz, Seneca Falls, N.Y.
[21] Appl. No. 17,215
[22] Filed Mar. 6, 1970
[23] Division of Ser. No. 737,179, June 14, 1968, abandoned
[45] Patented Oct. 5, 1971
[73] Assignee Sylvania Electric Products, Inc.

[54] PRINTED CIRCUIT WITH COMPONENTS
3 Claims, 5 Drawing Figs.

[52] U.S. Cl. .......... 317/101 C, 252/518, 338/308
[51] Int. Cl. .......... H02b 1/04
[50] Field of Search .......... 317/101, 101 C; 338/308, 309, 314, 212; 252/518; 174/52.6

[56] References Cited

UNITED STATES PATENTS

| | | | |
|---|---|---|---|
| 3,052,573 | 9/1962 | Dumesnil | 338/308 X |
| 3,098,950 | 7/1963 | Geshner | 174/52.6 |
| 3,238,151 | 3/1966 | Kim | 252/518 |
| 3,371,148 | 2/1968 | Roques | 174/52.6 |
| 3,411,947 | 11/1968 | Block | 338/308 X |
| 3,486,222 | 12/1969 | Schimmel | 338/314 X |
| 3,274,528 | 9/1966 | Bermann | 338/212 X |

OTHER REFERENCES

Radio & Television News High Temp. Adhesive Tape Resistor Jan. 1952 pp. 14 & 15

*Primary Examiner*—E. A. Goldberg
*Attorneys*—Norman J. O'Malley, Robert E. Walrath and Thomas H. Buffton

ABSTRACT: A process for fabricating resistor material includes the steps of casting a suspension to provide a film casting, heating to provide a film, cutting the film to size, attaching the film to a substrate, and firing to provide resistor material. A resistor is fabricated by a process of selecting a substrate, depositing a conductor pattern thereon, applying an adhesive, attaching a self-supporting cut film to the substrate, and firing the substrate and attached film and conductors to provide a resistor. An electrical circuit is provided by applying a solder layer to the conductor pattern on the substrate, attaching electrical components to the solder layer, and encapsulating the structure to provide an electrical circuit. A resistor includes a substrate, electrical conductors affixed thereto, and a layer of resistor material affixed to the conductors and conforming to the contour of the substrate.

*INVENTORS.*
JOSEPH B. BUZARD,
KENNETH W. COLEMAN, &
MARTIN L. ZELENZ
BY Robert E. Walrath
ATTORNEY

*INVENTORS.*
JOSEPH B. BUZARD,
KENNETH W. COLEMAN, &
MARTIN L. ZELENZ
BY Robert E. Walrath
ATTORNEY

PRINTED CIRCUIT WITH COMPONENTS

CROSS-REFERENCE TO RELATED APPLICATION

This application is a divisional application derived from U.S. application Ser. No. 737,179 filed June 14, 1968, now abandoned, in the names of Joseph Burton Buzard, Kenneth W. Coleman and Martin Leroy Zelenz and entitled "Resistive Material, Resistor and Electrical Circuit Fabricating Process."

BACKGROUND OF THE INVENTION

In fabricating resistive material, resistors, and electrical circuits of the "thick film" type employing such components, the known techniques include formating a mixture of resistive materials and a lacquer; spraying, painting, silk screening, spreading or in some manner depositing the mixture onto a substrate; firing the substrate and deposited layer; affixing electrical conductors to the layer; and varying the resistance value of the resultant structure by air abrasion or similar methods. Thereafter, individual electrical components such as capacitors are added to provide a "thick film" structure.

Although long and extensively used, it has been found that each of the above techniques leaves something to be desired. For example, spraying and painting techniques require a low-viscosity suspension wherein suspended particles tend to "settle out" rendering it most difficult if not impossible to maintain a uniform and consistent porosity of the resultant layer.

Also, silk screening and spreading techniques require a relatively viscous suspension. However, it has been found most difficult if not impossible to repeatedly and consistently provide layers of uniform thickness by screening and spreading techniques.

Further, all of the above-mentioned techniques tend to provide a layer of material having a thickness which varies in accordance with the contour of the substrate. Thus, a relatively expensive substrate having a relatively smooth surface is required to provide resistive material layers of uniform thickness when any of the above techniques are employed.

Additionally, resistive materials applied by any of the above techniques are more or less fixed and can only be altered after deposition by air abrasion and similar relatively expensive techniques. Moreover, deposition techniques such as silk screening tend to provide relatively nonuniform edges which, in turn, provide a relatively nonuniform and inconsistent quantity of deposited resistor material.

OBJECTS AND SUMMARY OF THE INVENTION

Therefore, it is an object of the present invention to provide an enhanced process for fabricating resistive material, resistors, and electrical circuits employing resistors. Another object of the invention is to provide an improved film technique for fabricating resistive material, resistors, and electrical circuits employing resistors. Still another object of the invention is to improve the uniformity and consistency of resistive material deposited intermediate a pair of conductors. A further object of the invention is the employment of a controlled atmosphere during resistor formation to enhance the uniformity of resistance value. A still further object of the invention is the provision of independent dual controls over the resistance material disposed intermediate a pair of conductors.

These and other objects and advantages are achieved in one aspect of the invention by a resistive-material-fabricating process including the steps of casting a suspension, heating the cast suspension to provide a film, cutting the film, attaching the film to a substrate and firing the film and substrate. Also, a resistor-fabricating process includes the steps of depositing conductors on a substrate, attaching a self-supporting film to the substrate, and firing the substrate and attached film. An electrical-circuit-fabricating process includes the resistor fabrication steps, applying a solder layer to the conductors on the substrate, and attaching electrical components to the solder layer. A resistor includes a substrate, conductors affixed thereto, and a uniformly thick layer of resistor material having one surface adapted to the contour of the substrate and the other surface conforming to the substrate contour.

DESCRIPTION OF THE PREFERRED EMBODIMENT

Figures 1, 3:
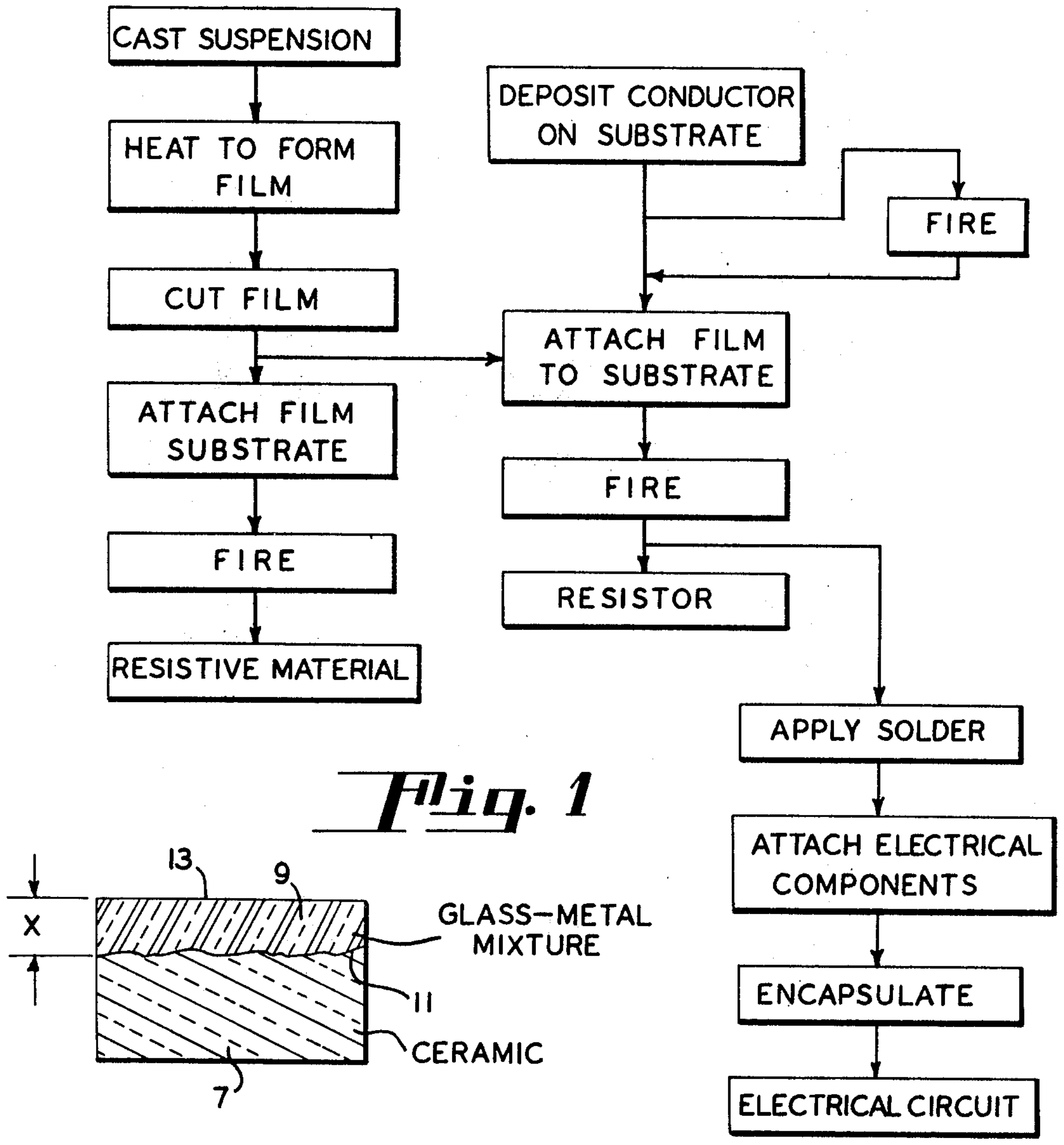
FIG. 1 is a flow chart illustrating a preferred process for fabricating resistive material, resistors, and electrical circuitry.
FIG. 3 is an illustration of a resistor fabricated in accordance with the prior art.

For a better understanding of the present invention, together with other and further objects, advantages and capabilities thereof, reference is made to the following disclosure and appended claims in connection with the accompanying drawings. As can be seen by the flow chart of FIG. 1, a process for fabricating resistive material, resistors, and an electrical circuit is provided.

Generally, the resistive-material-fabricating process includes casting a suspension of resistive materials in an organic lacquer of volatile binder and solvents to provide a film casting, heating the film casting to provide a pliable self-supporting film, and cutting the film to a predetermined configuration. The cut film is then attached to a substrate and the substrate and attached film fired in a controlled atmosphere to provide a resistive material.

More specifically, a volatile organic lacquer of binder and solvents is prepared and a resistive material added thereto. The full details regarding the preparation of such a suspension suitable for casting are provided in U.S. Pat. No. 3,017,281 entitled "Formulation For Casting a Pigmented Film" issued to Lambert et al. and assigned to the assignee of the present application.

As a specific example, the following organic lacquer was prepared:

| | |
|---|---|
| Toluene | 400 ml. |
| Anhydrol | 100 ml. |
| Butyl Carbitol | 15 ml. |
| Ethylene Carbonate | 100 gms. |
| Ethyl Cellulose N-300 | 30 gms. |

The ethyl cellulose N-300 binder in the above formulation has an ethoxyl content of between 47.5 and 49.0 percent by weight and a viscosity of approximately 300 centipoises in a 5.0 percent solution of 80:20 Toluene to Synasol. The butyl carbitol has been defined in Marck's Index, Sixth edition, as diethylene glycol monobutyl ether.

A mixture of solvents such as the above-listed toluene and anhydrol having different temperatures and rates of evaporation is provided in order to facilitate control over the swelling of the cellulose. Also, the ethylene carbonate not only acts as a temporary plasticizer but also serves as a density control additive for controlling porosity and producing voids assisting the escapement of volatilized materials.

Having prepared the above lacquer, about 35 grams of resistive materials is added to about 70 grams of lacquer to provide a viscous suspension. Although resistor materials such as thallium oxide, for example, may be used in the above mixture, a preferred resistive material is powder No. 448-7221R sold by E. I. duPont de Nemours and Company of Wilmington Del. This preferred resistive material is believed to include metal oxides from the group consisting of palladium and rhodium, a metal from the group consisting of silver, gold, and platinum, and a vitreous enamel frit.

The above suspension is then cast to provide a pliable self-supporting film of resistive materials homogeneously dispersed in a volatile organic binder. Such a process is set forth in U.S. Pat. No. 2,974,364 entitled "Process and Apparatus for Obtaining Smooth Surfaces on Films" issued to Lambert et al. and assigned to the assignee of the present application.

Briefly, the above suspension is continuously cast on to a moving support to provide a film casting. The physical characteristics of the film casting serve as representative information insofar as the final resultant resistance value of the film is concerned. Thus, the physical dimensions of film casting may be employed to provide information for altering the continuous casting operation to enhance the uniformity of the thickness of the film and the uniformity of resistance value obtainable.

The film casting disposed upon the moving support is heated in an amount sufficient to volatilize the solvents and render a pliable self-supporting film of resistive materials homogeneously dispersed in a volatile organic binder. It has been found that pliable self-supporting films having a thickness in the range of about 0.0005 to 0.010 inch are applicable to the process and a preferred thickness is about 0.002 inch. Moreover, it has been found that the film thickness is controllable within a range of about ±0.0001 inch.

The pliable self-supporting film of resistive material homogeneously dispersed in an organic binder is then cut to a dimension sufficient to provide a desired resistive value. Thus, the precision controlled casting technique provides a pliable self-supporting film having a relatively constant thickness, porosity, and resistive value and this resistive value is even more finely controllable by the provision of alterable cutting dimensions. In this manner, control of the deposited resistive material is enhanced. Moreover, the uniformity of the edge definition of the cut film also enhances the resistive value control capability.

Following, the pliable self-supporting cut film portion is applied to a substrate in a manner such that no carbonaceous residue is formed. Preferably, a solvent for the organic binder of the film is applied to the substrate and the film brought into contact therewith. Upon contact, the solvent tends to soften the film causing the film to adopt the contour of and become affixed to the substrate. Also, any excess solvent tends to evaporate under ordinary ambient conditions.

Alternatively, the pliable self-supporting film may be affixed to the substrate by applying an adhesive to the substrate and contacting the film and adhesive. As mentioned above, the adhesive must be of the type which does not provide a carbonaceous residue and a chlorinated biphenyl a light yellow, soft, sticky, resin, such as Aroclor No. 1260 manufactured by the Monsanto Chemical Company of St. Louis, Mo. is a preferred adhesive. Moreover, the Kirk-Orthner Encyclopedia of Chemical Technology, Second Edition, Volume 5, pages 289–296, Copyright 1964 by John Wiley & Sons Inc. fully details the adherent and other qualities of Aroclor brand chlorinated biphenyls commercially manufactured since 1929.

Thereafter, the affixed portion of film and the substrate are fired for a time, at a temperature, and in an atmosphere such that the organic constituents are volatilized and the resistive materials formed to provide a resistance value. Moreover, the atmosphere is controlled and of an oxygen-rich type such that undesired carbonaceous residue is prevented.

Figure 2:
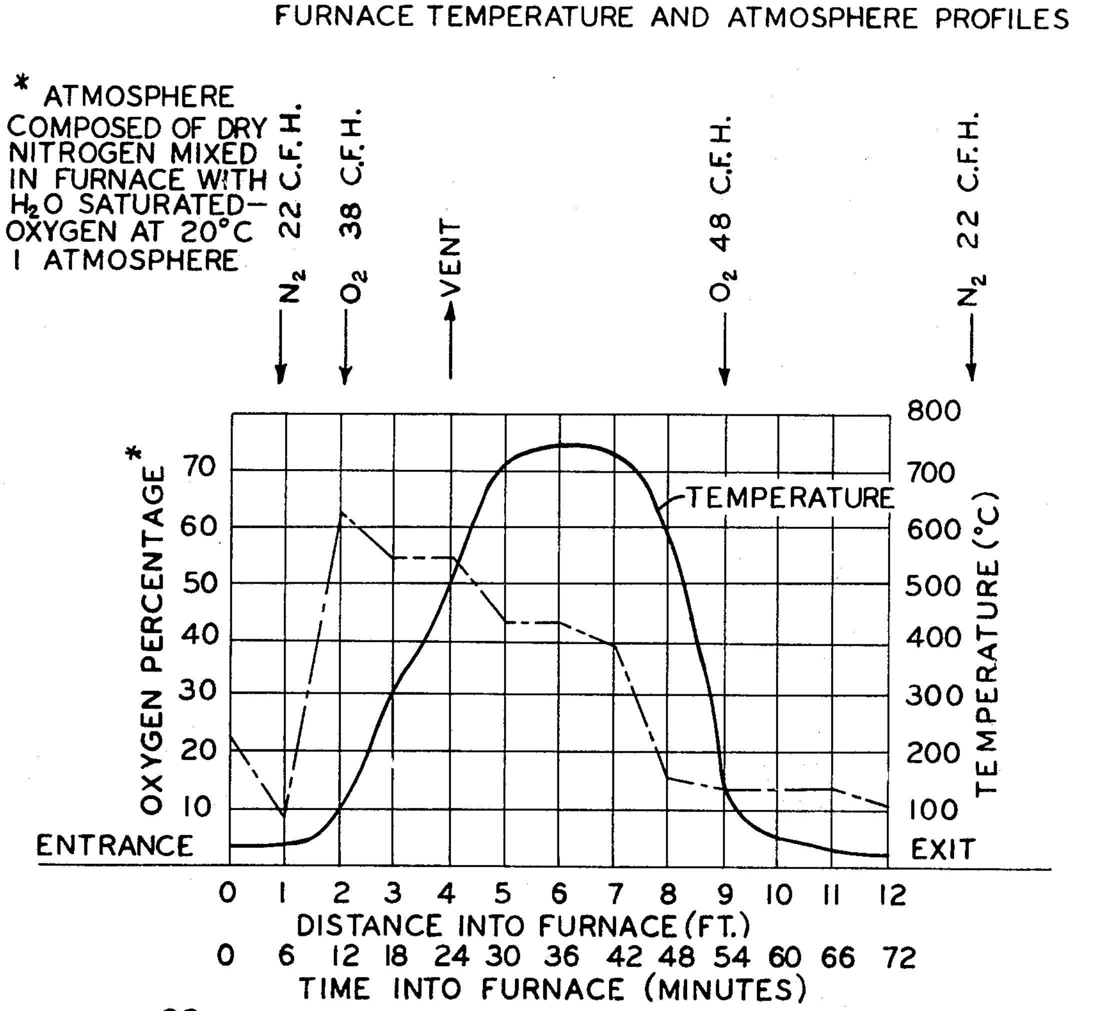
FIG. 2 is a profile of the firing step of the process illustrated in FIG. 1.

As a specific example of one preferred firing profile, reference is made to the illustration of Fig. 2. As can be seen, the profile includes a first period of increasing temperature, a second or "soak" period of substantially constant temperature, and a third period of decreasing temperature. Also, it can be seen that oxygen is introduced into the atmosphere during the first period of increasing temperature. It has been found that oxygen in an amount of about 45 to 75 percent by volume and, in this particular instance, about 60 percent by volume facilitates the volatilization of the organic constituents without the formation of undesired carbonaceous residue deleterious to the resistor material formation.

Further, it can be seen that the second or "soak" period of substantially constant temperature in the range of about 725° to 825° C. and in this instance about 760° to 800° C. for a period of about 8 to 16 minutes is carried out in an atmosphere of about 20 to 60 percent by volume of oxygen. Moreover, it can be seen that the oxygen content of the atmosphere gradually decreases to about 5 to 25 percent by volume at the final portion of the third period or decreasing temperature period of the profile.

Thus, it can be seen that there is provided a resistive material formed from a pliable self-supporting film. The film technique provides a relatively consistent and uniform thickness of materials and the process includes the additional capability of altering the cut configuration to provide a desired resistive value. Moreover, the film adopts the contour of the substrate without deleterious effect upon the quantity or thickness of the resistive material layer.

Referring back to the flow chart of Fig. 1, it can be seen that a resistor may be formed by a process which includes the steps of depositing conductors on a substrate, forming a pliable self-supporting film of resistive material, attaching the film to the conductor pattern on the substrate, and firing the substrate and attached film to provide a resistor. Also, an alternative arrangement includes the step of firing the deposited conductors prior to attachment of the pliable self-supporting film of resistive material in an organic binder.

More specifically, a substrate of dielectric material such as high-purity (above 94 percent) alumina for instance, is selected and after thorough cleaning has deposited thereon a pattern of conductor materials. Although numerous application techniques are appropriate, a preferred method for applying a pattern of the conductor materials to a substrate is the silk screen technique. Also, a preferred conductor material is a silver, palladium, glass frit mixture manufactured by E. I. DuPont de Nemours and Company, Wilmington, Del., and designated Dupont paste No. 8151.

The pattern of conductor material is then allowed to dry under ambient conditions or heat, as at 100° C. for 10 minutes in air for instance, may be but not necessarily need be applied thereto. Then the substrate and attached pattern of conductor materials is preferably fired substantially as illustrated in the profile of FIG. 2 to provide a conductor pattern. Also, the firing step may be omitted and the pattern of conductor material merely dried.

Following, a pliable self-supporting cut film portion of resistive materials homogeneously dispersed in an organic binder is applied to the pattern of conductor material on the substrate. As previously described with respect to the resistive material fabrication process, a solvent for the binder of the film is applied to the substrate and the film brought into contact therewith. Thereupon, the film is softened and adopts the contour of the substrate. Also, an adhesive material such as the previously described Aroclor material is applicable and appropriate for attaching the film to the substrate.

Thereafter, the substrate, affixed pattern of conductor materials, and affixed pliable self-supporting cut film portion are fired at a temperature, for a time, and in a controlled atmosphere such that the organic constituents of the film and conductor material are volatilized without carbonaceous residue formation, conductors are formed from the conductor material, and resistance material is formed from the resistive materials. Moreover, the resistance material overlaps and is electrically connected to the conductors to provide a resistor.

As a specific example, the substrate, affixed pattern of conductive materials, and attached pliable self-supporting cut film portion are fired in accordance with the profile of FIG. 2. In this manner, the silver and palladium of the conductive materials are sintered and the glass frit fused to provide conductors. Also, the resistive materials of the film are sintered and fused to provide a resistor material intermediate and electrically connected with the pattern.

Thus, a process for fabricating resistors from a pliable self-supporting film has been provided. The resistor is of uniform thickness and of a dimensioned configuration dependent upon the amount of resistor material and, in turn, the value of resistor desired. Moreover, the process provides excellent control of the resultant ohmic value of the resistor.

Referring again to the flow chart of FIG. 1, a process for fabricating electrical circuits, of the "thick film" type for instance, includes the previously described depositing of an electrical conductor pattern on a substrate, forming a pliable self-supporting film of resistive materials homogeneously dispersed in a volatile organic binder, affixing the film to the substrate, and firing the substrate and film. Also, a layer of solder is applied to the previously deposited electrical conductor pattern and electrical components are affixed to the solder layer.

More specifically, the conductor pattern and resistor are affixed to the substrate with the resistor overlapping and electrically connected to the conductors. Thereafter, a solder layer is applied to the conductor pattern and the well-known dip solder technique is preferred. The electrical components such as "chip" capacitors, semiconductors, and inductors are affixed to the substrate by glue or some such temporary means and the solder layer reflowed by applied heat to electrically connect the electrical components.

In this manner an electrical circuit of the "thick film" type is provided. Also, a plurality of electrical connectors may be affixed to the conductor pattern, as by soldering, and the substrate, affixed conductor pattern, and affixed electrical components encapsulated with a water- and vapor-resistant envelope in a manner well known in the art.

Additionally, FIG. 3 will serve to illustrate resistor structures fabricated in accordance with such prior art techniques as painting, spraying, spreading, and silk screening. In FIG. 3, a resistor includes a substrate 7 of dielectric material and a layer 9 of resistor materials affixed thereto. As can be seen, the resistor material layer 9 has one surface 11 conforming to the surface of the substrate 7. However, the process whereby the resistor material layer 9 is deposited inherently caused the formation of a substantially even surface 13. Thus, the thickness dimension "X" of the resistor material layer 9 undesirably varies causing an undesired variation in deposited resistive material and an undesired variation in resistance value.

Figure 4:
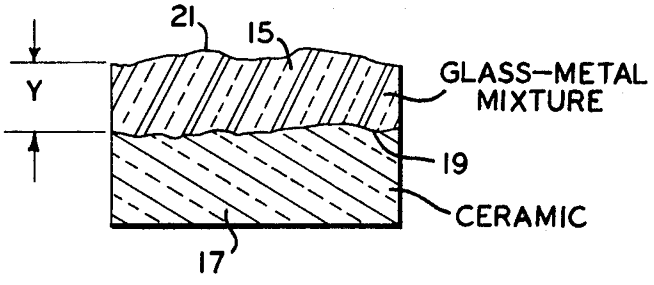
FIG. 4 is an illustration of a resistor fabricated in accordance with the flow chart of FIG. 1.

Referring to FIG. 4, therein is illustrated a resistor fabricated from a pliable self-supporting film of resistive materials suspended in a volatile organic binder. As can be seen, a film 15 is affixed to a substrate 17. The film has one surface 19 adapted to the contour of the substrate 17. Also, the opposite surface 21 of the film 15 conforms to the contour of the substrate 17. Moreover, it can be readily seen that the thickness "Y" of the film remains substantially constant regardless of the contour of the substrate, whereupon the amount of deposited resistive material and the resistance value do not undesirably vary because of substrate and deposition nonuniformity.

Figure 5:
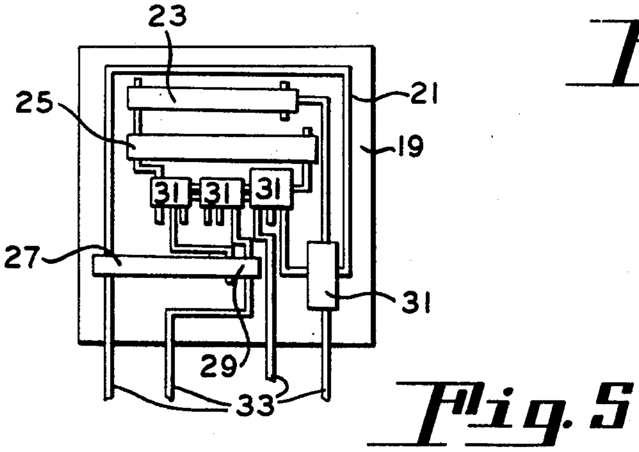
FIG. 5 illustrates an electrical circuit fabricated in accordance with the flow chart of FIG. 1.

Additionally, FIG. 5 illustrates an electrical circuit of the "thick film" type fabricated in accordance with the flow chart of FIG. 1. As can be seen, the structure includes a substrate 19 of dielectric material such as high-purity alumina and a solder layer 21 attached to and substantially covering a pattern of conductors affixed to the substrate 19.

Overlying and interconnecting portions of the solder layer 21 are resistors 23, 25, 27, and 29 fabricated from pliable self-supporting film of conductor materials dispersed in an organic lacquer. Also, affixed to the substrate 19 and interconnecting portions of the solder layer 21 are electrical components 31. Moreover, a plurality of electrical conductors 33 are connected to the solder layer 21 and extend outwardly from the substrate 19. An encapsulating layer of electrical insulating material surrounds and is affixed to the substrate 19, resistors 23, 25, 27, and 29, and electrical components 31.

Further, the resistor materials may be of a material such as sintered thallium oxide and fused glass particles. Preferably, the resistor materials include a metal oxide from the group consisting of palladium and rhodium oxides, a metal from the group consisting of silver, gold, and platinum, and a fused vitreous enamel frit.

Thus, there has been provided an enhanced process for fabricating resistive material, resistors, and electrical circuitry as well as an electrical resistor structure. The improved fabricating processes embody a unique film technique having numerous advantages over prior-known methods for fabricating resistive material, resistors, and electrical circuitry. Moreover, the fabricating processes insure a resultant structure of increased uniformity of increased repeatability, and of economical cost.

Further, the process not only provides a means for readily varying the resistance value of the self-supporting film by altering the thickness thereof, but also provides a means for readily altering the dimensional configuration and amount of deposited resistive material without resorting to complex and expensive changes in apparatus and equipment. Moreover, the conformance of the film to the contour of the substrate insures uniformity of resistor value despite a nonuniformity of the substrate surface.

While there has been shown and described what is at present considered the preferred embodiments of the invention, it will be obvious to those skilled in the art that various changes and modifications may be made therein without departing from the invention as defined in the appended claims.

1. An electrical circuit of the "thick film" type including a substrate of dielectric materials having one surface of predetermined contour;

a pattern of electrical conductors affixed to said one surface of said substrate;

a solder layer affixed to said pattern of electrical conductors;

a layer of resistor materials formed from pliable self-supporting films having a substantially uniform thickness affixed by a chlorinated biphenyl adhesive to said substrate and overlaying and electrically interconnecting certain ones of said conductors, said layer having a pair of opposite surfaces with one surface affixed to the substrate and both surfaces conforming to the contour of said substrate; and a plurality of electrical components affixed to said substrate and electrically connected to said solder layer whereby an electrical circuit is provided.

2. The electrical circuit of claim 1 wherein said resistor material includes thallium oxide.

3. The electrical circuit of claim 1 wherein said chlorinated biphenyl adhesive is in the form of a light yellow, soft, sticky resin.